United States Patent
Kosaka et al.

(10) Patent No.: US 10,189,532 B2
(45) Date of Patent: Jan. 29, 2019

(54) BICYCLE OPERATING DEVICE

(71) Applicant: SHIMANO INC., Sakai (JP)

(72) Inventors: Kentaro Kosaka, Sakai (JP); Shinji Kawamura, Sakai (JP); Yoshimitsu Miki, Sakai (JP); Naoki Fujimoto, Sakai (JP)

(73) Assignee: SHIMANO INC., Sakai (JP)

( * ) Notice: Subject to any disclaimer, the term of this patent is extended or adjusted under 35 U.S.C. 154(b) by 233 days.

(21) Appl. No.: 15/208,562

(22) Filed: Jul. 12, 2016

(65) Prior Publication Data

US 2018/0015980 A1 Jan. 18, 2018

(51) Int. Cl.
| | |
|---|---|
| *B62K 23/02* | (2006.01) |
| *B62M 25/04* | (2006.01) |
| *B62L 3/02* | (2006.01) |
| *B62K 23/06* | (2006.01) |

(52) U.S. Cl.
CPC .............. *B62K 23/06* (2013.01); *B62L 3/023* (2013.01); *B62M 25/04* (2013.01)

(58) Field of Classification Search
CPC ......... B62K 23/04; B62K 23/06; B62L 3/023; B62M 25/04; B62M 25/045; B62M 25/08
See application file for complete search history.

(56) References Cited

U.S. PATENT DOCUMENTS

| | | | | |
|---|---|---|---|---|
| 5,479,776 | A * | 1/1996 | Romano | B62K 23/06 192/217 |
| 8,459,142 | B2 * | 6/2013 | Orrico | B62K 23/06 74/502.2 |
| 9,056,597 | B2 * | 6/2015 | Fukao | B62M 25/04 |
| 9,321,506 | B2 * | 4/2016 | Matsueda | B62K 23/06 |
| 9,381,975 | B2 * | 7/2016 | Fukao | B62K 23/06 |
| 9,469,381 | B2 * | 10/2016 | Watarai | B62M 25/00 |
| 9,718,515 | B2 * | 8/2017 | Watarai | B62M 25/04 |
| 9,802,671 | B2 * | 10/2017 | Dal Pra | B62L 3/02 |
| 9,821,881 | B2 * | 11/2017 | Matsueda | B62L 3/023 |
| 9,834,276 | B2 * | 12/2017 | Watarai | B62L 3/023 |
| 9,873,483 | B2 * | 1/2018 | Watarai | B62M 25/04 |
| 2010/0083788 | A1 | 4/2010 | Jordan et al. | |
| 2013/0233112 | A1 | 9/2013 | Miki et al. | |
| 2018/0015982 | A1 * | 1/2018 | Matsueda | B62K 23/06 |

\* cited by examiner

*Primary Examiner* — Adam D Rogers
(74) *Attorney, Agent, or Firm* — Mori & Ward, LLP

(57) ABSTRACT

A bicycle operating device comprises a base member, an operating unit, and a support shaft. The operating unit includes a rotatable member rotatable relative to the base member about a first rotational axis to control a bicycle component. The operating unit has a first operating unit end supported by the base member and a second operating unit end opposite to the first operating unit end along the first rotational axis. The support shaft extends in a direction non-parallel to the first rotational axis and couples the second operating unit end to the base member. The support shaft has a first end and a second end opposite to the first end. The first end and the second end are supported by the base member.

18 Claims, 14 Drawing Sheets

BICYCLE OPERATING DEVICE

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with a first aspect of the present invention, a bicycle operating device comprises a base member, an operating unit, and a support shaft. The operating unit includes a rotatable member rotatable relative to the base member about a first rotational axis to control a bicycle component. The operating unit has a first operating unit end supported by the base member and a second operating unit end opposite to the first operating unit end along the first rotational axis. The support shaft extends in a direction non-parallel to the first rotational axis and couples the second operating unit end to the base member. The support shaft has a first end and a second end opposite to the first end. The first end and the second end are supported by the base member.

With the bicycle operating device according to the first aspect, the operating unit is supported by the base member at least three points of the base member. Accordingly, the operating unit is stably supported by the base member. In addition, two of the at least three points are the first end and the second end of the support shaft. Accordingly, it can simplify the supporting architecture for the operating unit. Therefore, it can effectively utilize an inner space of the base member.

In accordance with a second aspect of the present invention, the bicycle operating device according to the first aspect further comprises a pivot pin, an operating member, and a biasing member. The pivot pin is coupled to the base member. The operating member is rotatably coupled to the base member via the pivot pin. The biasing member is wound about the pivot pin. The biasing member having a first biasing member end hooked on the support shaft.

With the bicycle operating device according to the second aspect, the support shaft is used for fixing a position of the first biasing member end in addition to supporting the operating unit. Accordingly, it is possible to reduce parts of the bicycle operating device and to reduce a manufacturing cost.

In accordance with a third aspect of the present invention, the bicycle operating device according to one of the above aspects is configured so that the biasing member is configured to bias the operating member toward a rest position.

With the bicycle operating device according to the third aspect, it is possible to return the operating member to the rest position when the operating member is not operated by a user.

In accordance with a fourth aspect of the present invention, the bicycle operating device according to one of the above aspects is configured so that the support shaft has a groove. The biasing member is hooked on the groove.

With the bicycle operating device according to the fourth aspect, the biasing member can be stably hooked on the support shaft.

In accordance with a fifth aspect of the present invention, the bicycle operating device according to one of the above aspects further comprises a hydraulic unit. The hydraulic unit is configured to generate a hydraulic pressure in response to a movement of the operating member. The hydraulic unit includes a cylinder and a piston disposed in the cylinder. The piston is coupled to the operating member. The biasing member has a second biasing member end opposite to the first biasing member end. The second biasing member end is hooked on the piston.

With the bicycle operating device according to the fifth aspect, it is possible to return the piston to an initial position when the operating member is not operated by a user.

In accordance with a sixth aspect of the present invention, the bicycle operating device according to one of the above aspects is configured so that the second biasing member end is positioned opposite to the operating member relative to the pivot pin.

With the bicycle operating device according to the sixth aspect, it is possible to return the piston and the operating member effectively when the operating member is not operated by a user.

In accordance with a seventh aspect of the present invention, the bicycle operating device according to one of the above aspects is configured so that the pivot pin and the support shaft are substantially parallel to each other.

With the bicycle operating device according to the seventh aspect, the support shaft can stably support the biasing member.

In accordance with an eighth aspect of the present invention, the bicycle operating device according to one of the above aspects is configured so that the support shaft is disposed between the pivot pin and operating unit viewed in a direction parallel to the pivot pin.

With the bicycle operating device according to the eighth aspect, the first biasing member end of the biasing member is hooked on a member close to the biasing member. Accordingly, the biasing member can be miniaturized, and it can effectively utilize an inner space of the base member.

In accordance with a ninth aspect of the present invention, the bicycle operating device according to one of the above aspects further comprises an additional support shaft. The additional support shaft is coupled to the base member and supports the operating unit. The additional support shaft defines the first rotational axis.

With the bicycle operating device according to the ninth aspect, the additional support shaft can rotatably support the operating unit in a stable manner.

In accordance with a tenth aspect of the present invention, the bicycle operating device according to one of the above aspects is configured so that the rotatable member includes a cable holding section configured to engage with a cable.

With the bicycle operating device according to the tenth aspect, the operating unit can control a bicycle component using the cable.

In accordance with an eleventh aspect of the present invention, the bicycle operating device according to one of the above aspects is configured so that the operating unit is a shift operating unit to operate a shift device to perform gear shift of a bicycle.

With the bicycle operating device according to the eleventh aspect, a user can perform the gear shift by operating the bicycle operating device.

In accordance with a twelfth aspect of the present invention, the bicycle operating device according to one of the above aspects is configured so that the base member includes a first end portion and a second end portion. The first end portion is configured to be coupled to a bicycle handle in a state where the bicycle operating device is mounted to the bicycle handle. The second end portion is opposite to the first end portion. The support shaft is provided between the first end portion and the second end portion.

With the bicycle operating device according to the twelfth aspect, it is possible to mount the bicycle operating device to a road bicycle.

In accordance with a thirteenth aspect of the present invention, the bicycle operating device according to one of the above aspects is configured so that the first end portion includes a mounting surface having a curved shape corresponding to a drop-down handlebar.

With the bicycle operating device according to the thirteenth aspect, it is possible to firmly fix the bicycle operating device to a drop-down handlebar.

In accordance with a fourteenth aspect of the present invention, the bicycle operating device according to one of the above aspects is configured so that the base member includes a grip portion arranged between the first end portion and the second end portion.

With the bicycle operating device according to the fourteenth aspect, the base member allows the user to easily operate the operating member.

In accordance with a fifteenth aspect of the present invention, the bicycle operating device according to one of the above aspects is configured so that the second end portion includes a pommel portion.

With the bicycle operating device according to the fifteenth aspect, the pommel portion allows the user to lean on the base member during riding a bicycle.

In accordance with a sixteenth aspect of the present invention, the bicycle operating device according to one of the above aspects is configured so that the base member is made of resin.

With the bicycle operating device according to the sixteenth aspect, it is possible to save weight of the bicycle operating device. In addition, it is easy to form the bicycle operating device by molding.

In accordance with a seventeenth aspect of the present invention, the bicycle operating device according to one of the above aspects further comprises an operating member rotatably coupled to the base member via the support shaft.

With the bicycle operating device according to the seventeenth aspect, the support shaft is used for supporting the operating member in addition to the operating unit. Accordingly, it is possible to reduce parts of the bicycle operating device and to reduce a manufacturing cost.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
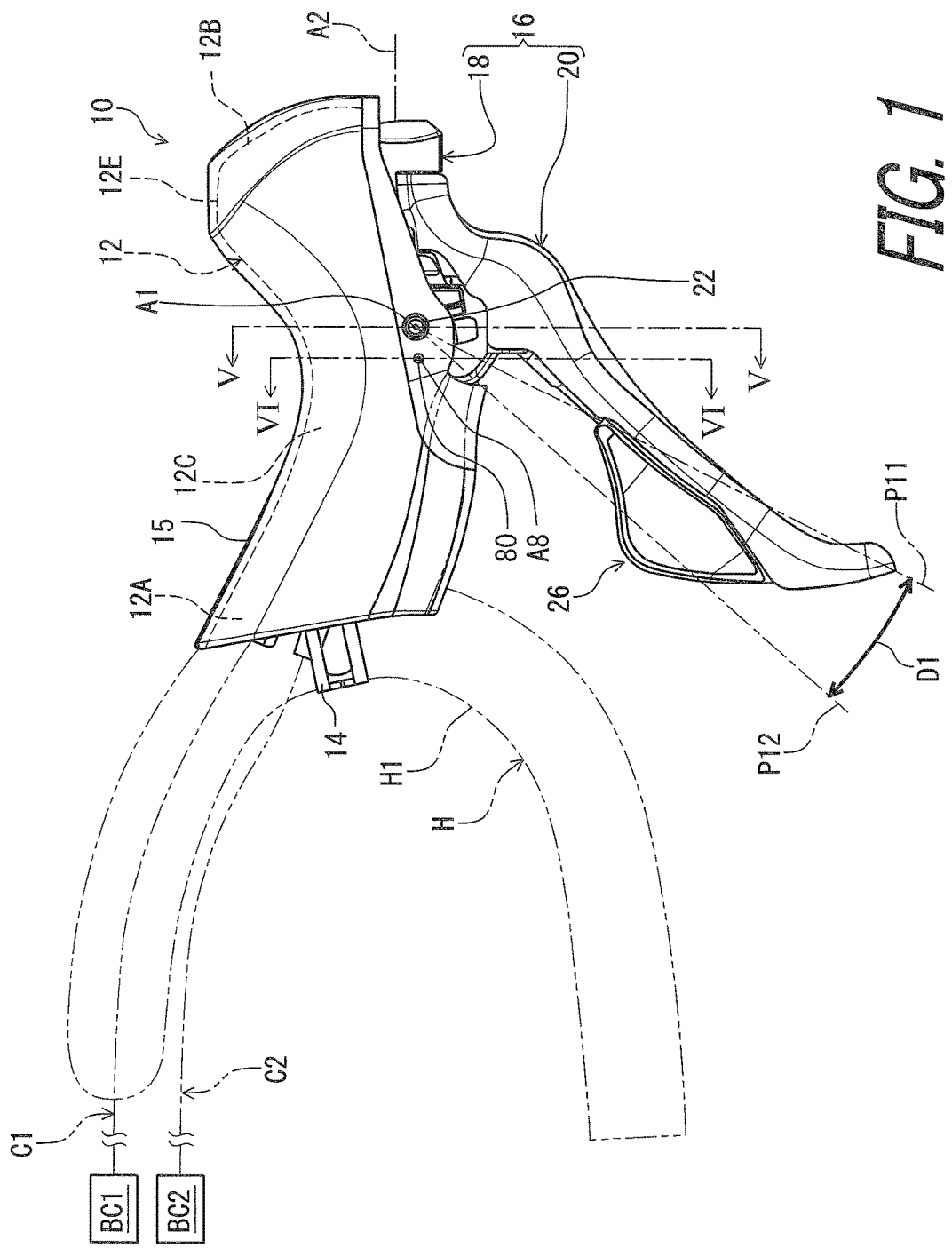
FIG. 1 is a right side elevational view of a bicycle operating device in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be mounted to a bicycle handle H of a bicycle. In this embodiment, the bicycle operating device 10 is configured to be mounted to a drop-down handlebar. However, structures of the bicycle operating device 10 can be applied to other type of handlebars such as a flat handlebar, a time trial handlebar, and a bull horn handlebar. The bicycle handle H can also be referred to as the handlebar H. The handlebar H can also be referred to as the drop-down handlebar H. Furthermore, the bicycle operating device 10 can be mounted to parts other than the handlebar H in the bicycle. Since structures of the bicycle have been known in the bicycle field, they will not be described in detail here for the sake of brevity.

The bicycle operating device 10 is operatively coupled to a hydraulic bicycle component BC1 such as a hydraulic bicycle brake. In this embodiment, the bicycle operating device 10 is operatively coupled to the hydraulic bicycle component BC1 via a hydraulic hose C1.

Furthermore, the bicycle operating device 10 is operatively coupled to a mechanical controlled bicycle component BC2. In this embodiment, the bicycle operating device 10 is operatively coupled to the mechanical controlled bicycle component BC2 via a mechanical control cable C2. The mechanical controlled bicycle component BC2 can be simply referred to as a bicycle component BC2. Examples of the bicycle component BC2 include a shift device, an adjustable seatpost assembly, and a bicycle suspension. Examples of the mechanical control cable C2 include a Bowden cable. In this embodiment, the bicycle component BC2 includes the shift device to perform gear shift of a bicycle. The bicycle component BC2 can also be referred to as the shift device BC2.

In this embodiment, the bicycle operating device 10 is a right hand side control device configured to be operated by the rider's right hand to actuate the hydraulic bicycle component BC1 and the mechanical controlled bicycle component BC2. However, the structures of the bicycle operating device 10 can be applied to a left hand side control device.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of the bicycle with facing the handlebar H. Accordingly, these terms, as utilized to describe the bicycle operating device 10, should be interpreted relative to the bicycle equipped with the bicycle operating device 10 as used in an upright riding position on a horizontal surface.

As seen in FIG. 1, the bicycle operating device 10 comprises a base member 12. The base member 12 is configured to be mounted to the handlebar H of the bicycle. However, the base member 12 can be mounted to parts other than the handlebar H in the bicycle. The base member 12 is made of a non-metallic material such as a resin material. In this embodiment, the base member 12 is made of resin. For example, the base member 12 is made of synthetic resin. The base member 12 is integrally formed by using integral molding. However, the base member 12 can be made of other materials such as a metallic material. For example, the base member 12 can be made of aluminum by using molding.

The base member 12 includes a first end portion 12A, a second end portion 12B, and a grip portion 12C. The first end portion 12A is configured to be coupled to the bicycle handle H in a state where the bicycle operating device 10 is mounted to the bicycle handle H. Hereinafter, the state where the bicycle operating device 10 is mounted to the bicycle handle H can be referred to as a mounting state. The second end portion 12B is opposite to the first end portion 12A. The grip portion 12C is provided between the first end portion 12A and the second end portion 12B.

The drop-down handlebar H includes a curved part H1. The first end portion 12A is configured to be coupled to the curved part H1 in the mounting state of the bicycle operating device 10. The bicycle operating device 10 comprises a mounting clamp 14 to couple the base member 12 to the bicycle handle H.

Figure 2:
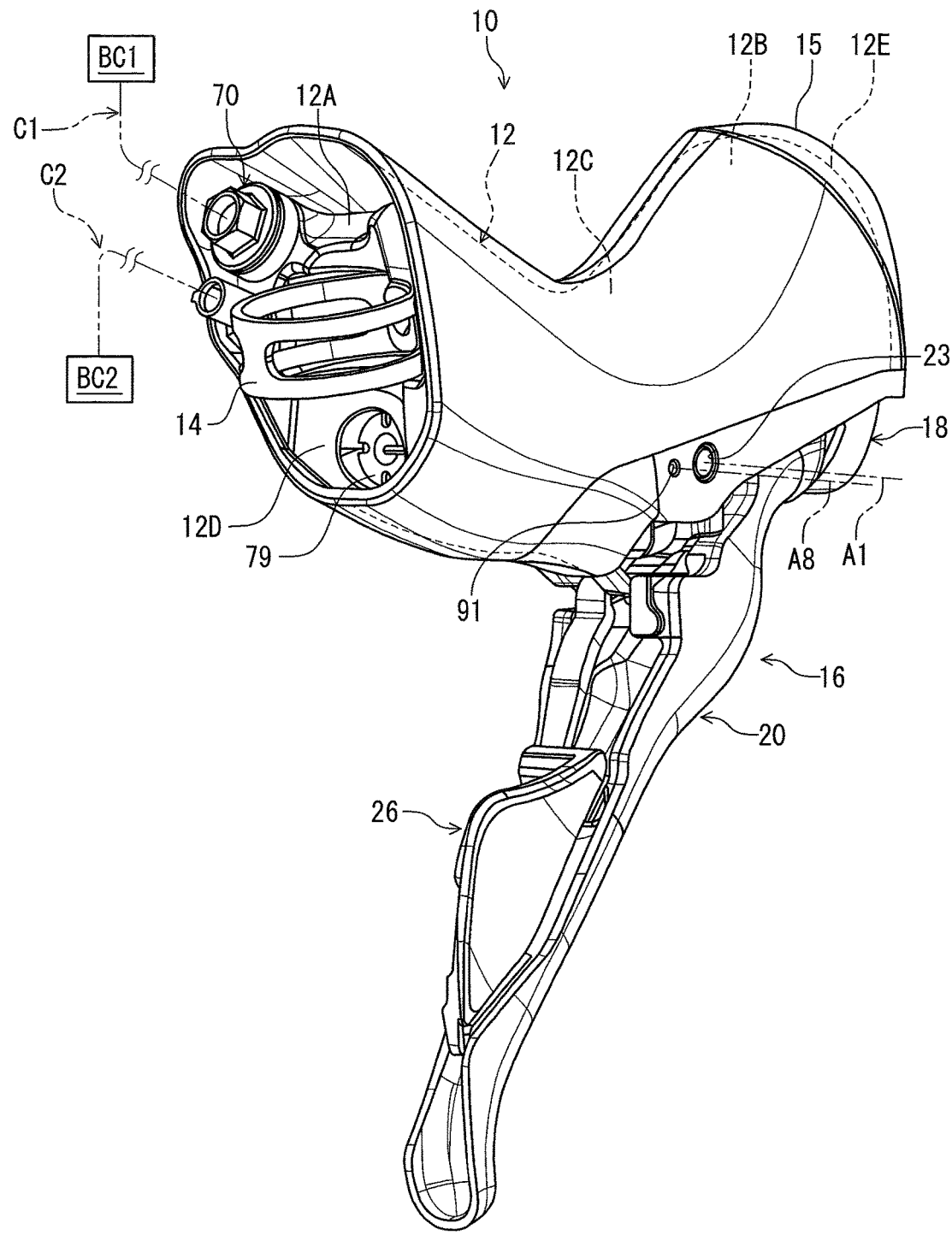
FIG. 2 is a perspective view of the bicycle operating device illustrated in FIG. 1.

As seen in FIG. 2, the first end portion 12A includes a mounting surface 12D having a curved shape corresponding to the drop-down handlebar H. Specifically, the mounting surface 12D has the curved shape corresponding to an outer peripheral surface of the curved part H1.

As seen in FIGS. 1 and 2, the second end portion 12B includes a pommel portion 12E. The pommel portion 12E extends obliquely upward from the grip portion 12C. The pommel portion 12E is disposed above the first end portion 12A in the mounting state of the bicycle operating device 10. The pommel portion 12E can also be configured to be graspable if needed and/or desired.

In this embodiment, the bicycle operating device 10 further comprises a cover member 15 attached to the base member 12 to at least partly cover the base member 12. The cover member 15 is at least partly made of elastic material such as rubber.

As seen in FIG. 1, the bicycle operating device 10 comprises an operating member 16. The operating member 16 is pivotally coupled to the base member 12 about a pivot axis A1. The operating member 16 extends downward from the base member 12 in the mounting state of the bicycle operating device 10. In this embodiment, the operating member 16 is pivotable relative to the base member 12 about the pivot axis A1 in a first operating direction D1. The operating member 16 is configured to be pivotable relative to the base member 12 between a rest position P11 (hereinafter the first rest position P11) and an operated position P12 (hereinafter the first operated position P12). The first operating direction D1 is a circumferential direction defined about the pivot axis A1. In this embodiment, the operating member 16 is provided as a brake operating lever pivotable about the pivot axis A1.

In the present application, the term "rest position" as used herein refers to a position at which a movable part such as the operating member 16 remains stationary in a state where the movable part is not operated by the user. The term "operated position" as used herein refers to a position at which the movable part has been operated by the user to perform the operation of the bicycle component.

Figure 3:
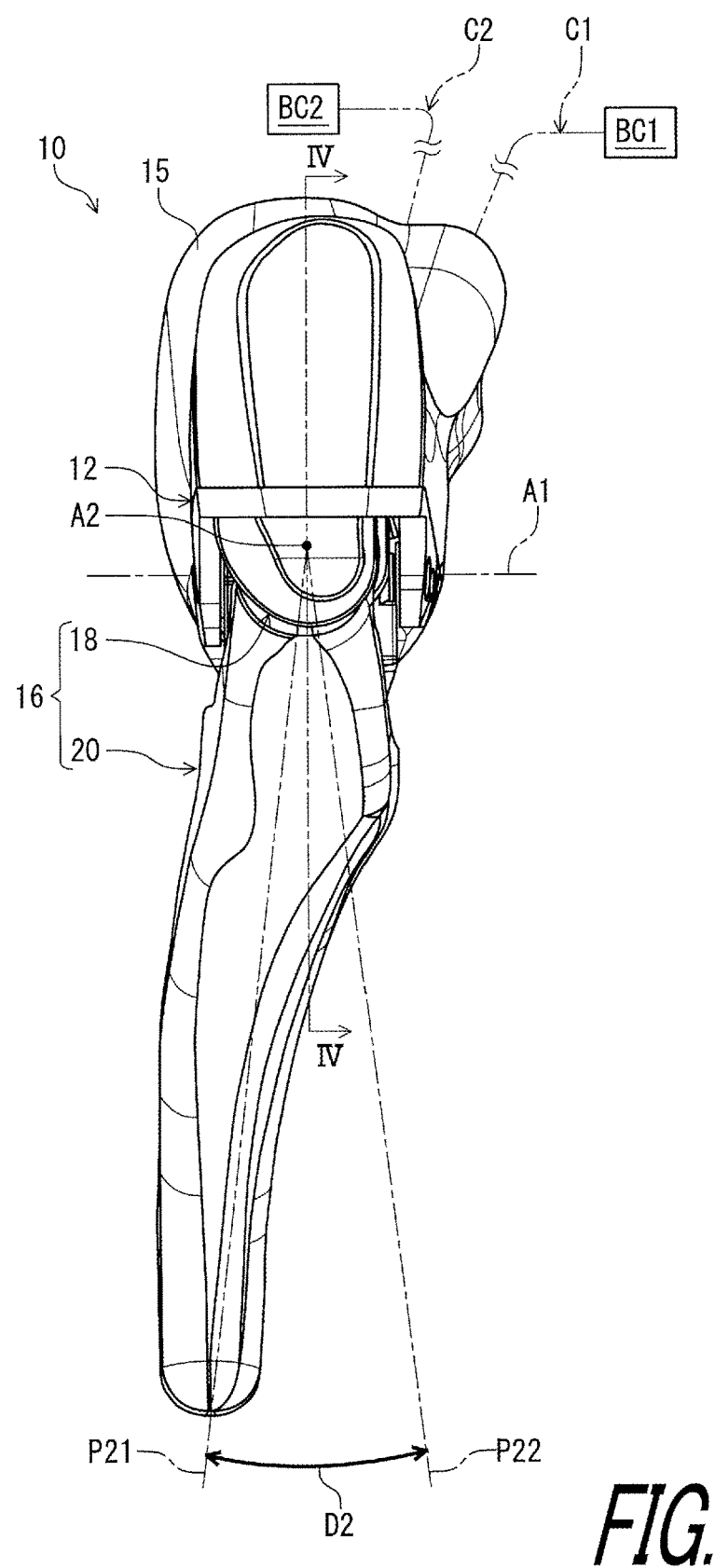
FIG. 3 is a front view of the bicycle operating device illustrated in FIG. 1.

As seen in FIG. 3, the operating member 16 is pivotable relative to the base member 12 about an additional pivot axis A2 in a second operating direction D2. The operating member 16 is pivotable relative to the base member 12 between a second rest position P21 and a second operated position P22. The second operating direction D2 is a circumferential direction defined about the additional pivot axis A2. In this embodiment, the operating member 16 is provided as a shift lever pivotable about the additional pivot axis A2. However, the function of the shift lever can be omitted from the operating member 16.

As seen in FIGS. 1 and 3, the operating member 16 includes a base portion 18 and an operating portion 20. The base portion 18 is pivotally coupled to the base member 12 about the pivot axis A1. The operating portion 20 is pivotally provided on the base portion 18 about the additional pivot axis A2.

Figure 4:
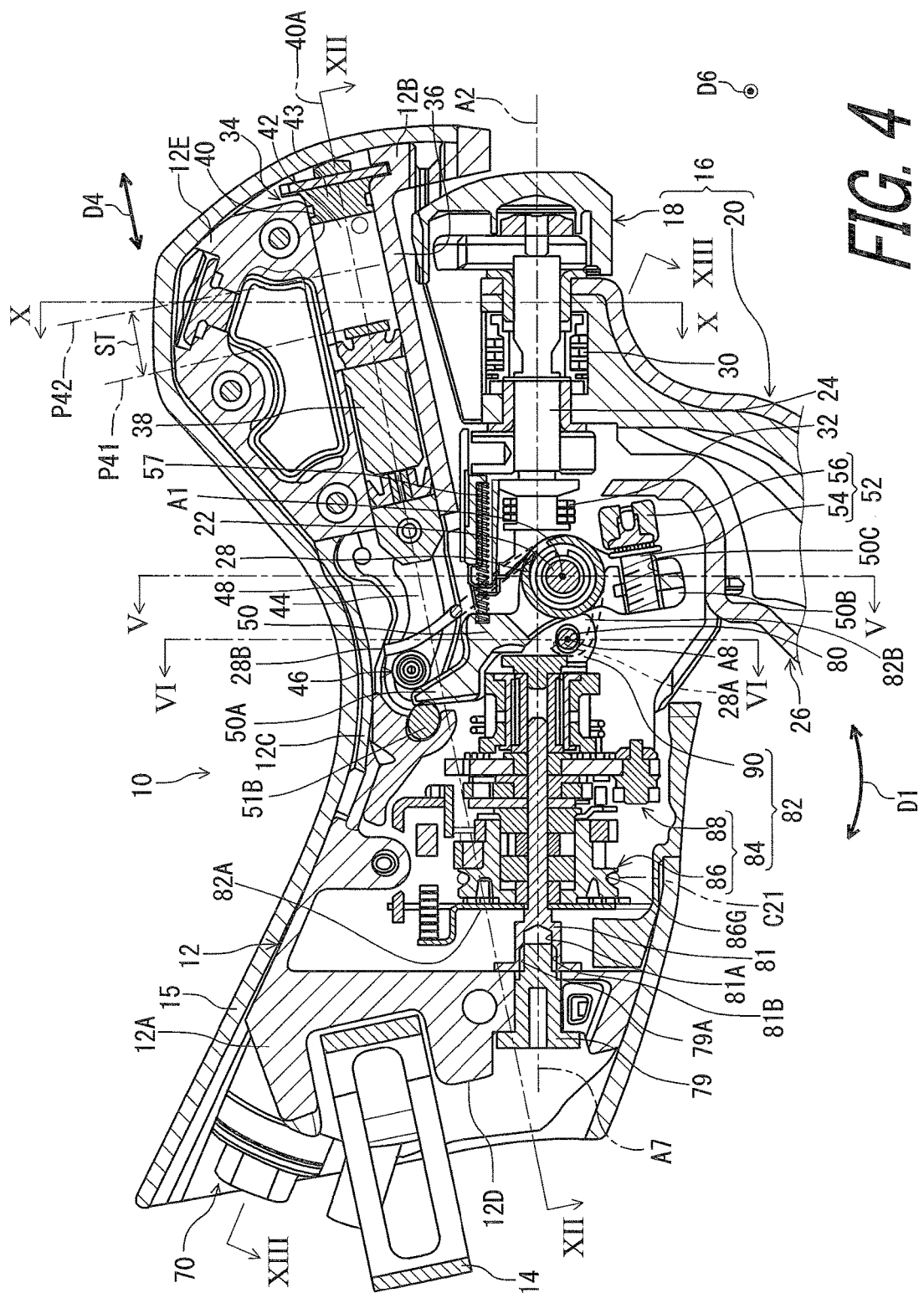
FIG. 4 is a partial cross-sectional view of the bicycle operating device taken along line IV-IV of FIG. 3.
Figure 5:
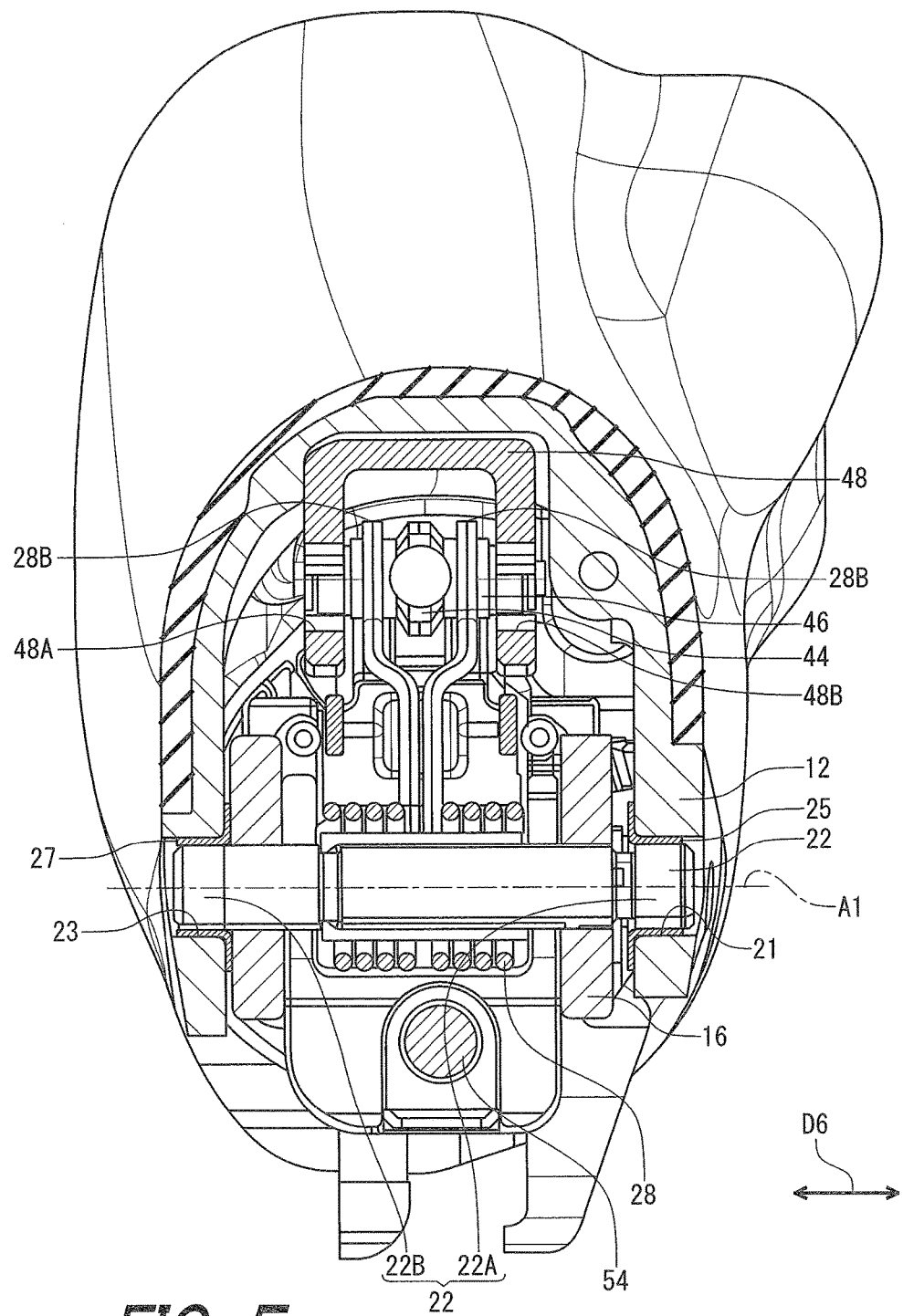
FIG. 5 is a partial cross-sectional view of the bicycle operating device taken along line V-V of FIG. 1.

As seen in FIG. 4, the bicycle operating device 10 comprises a pivot pin 22. The pivot pin 22 defines the pivot axis A1. As seen in FIG. 5, the pivot pin 22 is coupled to the base member 12. Specifically, the base member 12 has a first through hole 21 and a second through hole 23. The second through hole 23 is opposite to the first through hole 21 in a direction D6 substantially parallel to the pivot axis A1. The pivot pin 22 includes a first pin end 22A and a second pin end 22B opposite to the first pin end 22A in the direction D6. The first pin end 22A is received in the first through hole 21 via a first intermediate member 25. The second pin end 22B is received in the second through hole 23 via a second intermediate member 27. The operating member 16 is rotatably coupled to the base member 12 via the pivot pin 22. The operating member 16 may be rotatable relative to the pivot pin 22 that is not rotatable relative to the base member 12. Alternatively, the operating member 16 may not be rotatable relative to the pivot pin 22 that is rotatable relative to the base member 12. Further, as seen in FIG. 4, the bicycle operating device 10 comprises an additional pivot pin 24. The additional pivot pin 24 defines the additional pivot axis A2. The base portion 18 is pivotally coupled to the base member 12 via the pivot pin 22. The operating portion 20 is pivotally coupled to the base portion 18 about the additional pivot axis A2 via the additional pivot pin 24.

Figure 7:
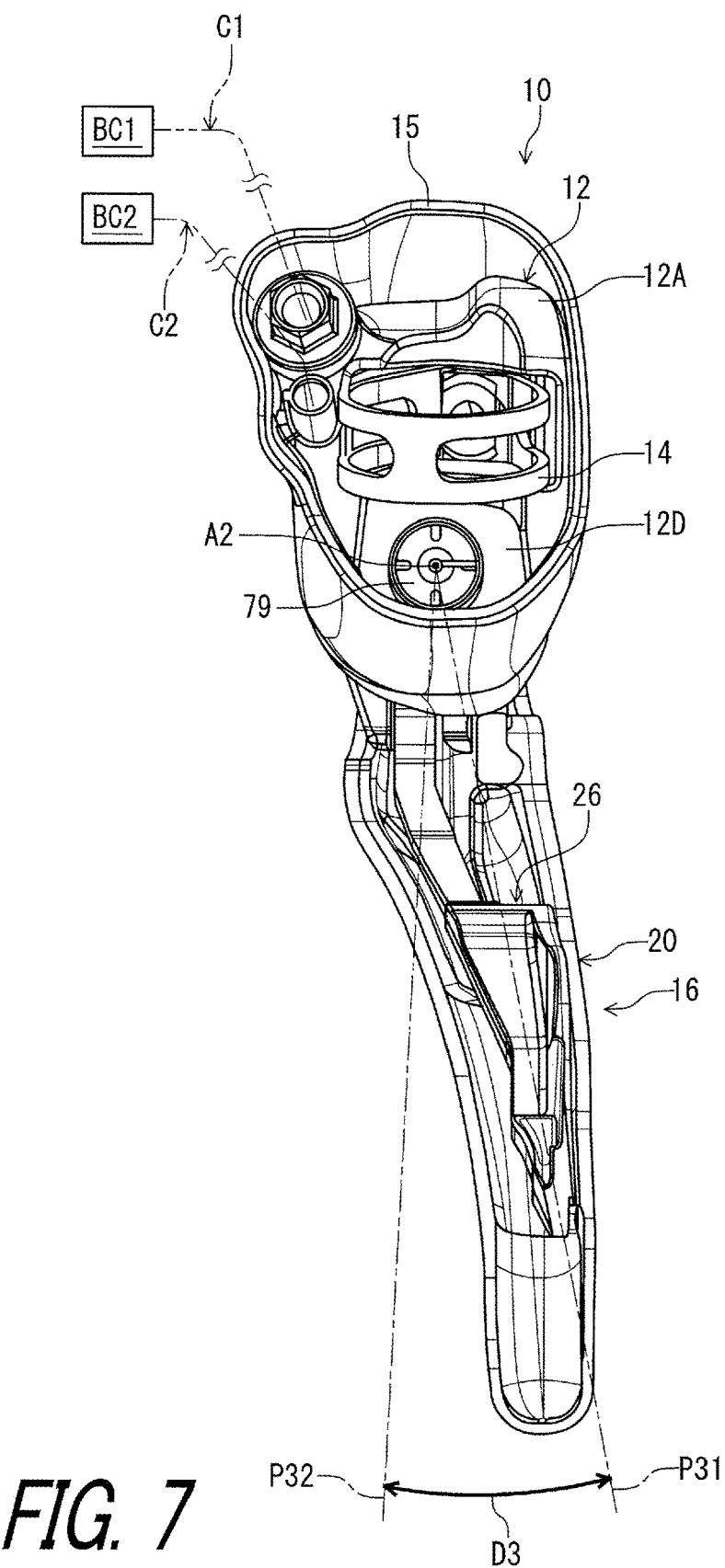
FIG. 7 is a rear view of the bicycle operating device illustrated in FIG. 1.

As seen in FIGS. 1 and 7, the bicycle operating device 10 further comprises an additional operating member 26. The additional operating member 26 is pivotally provided on one of the operating member 16 and the base member 12 about the additional pivot axis A2. In this embodiment, the additional operating member 26 is provided on the operating member 16. Specifically, the additional operating member 26 is pivotable relative to the base member 12 about the additional pivot axis A2 in the third operating direction D3. The additional operating member 26 is pivotable relative to the base member 12 between a third rest position P31 and a third operated position P32. The additional operating member 26 is pivotally coupled to the base portion 18 via the additional pivot pin 24. The additional operating member 26 is pivotable relative to the base portion 18 about the additional pivot axis A2. In this embodiment, the additional operating member 26 is provided as an additional shift lever pivotable about the additional pivot axis A2. The additional operating member 26 can be omitted from the bicycle operating device 10.

As seen in FIG. 4, the bicycle operating device 10 comprises a first biasing member 28 configured to bias the operating member 16 toward the first rest position P11 (FIG. 1) relative to the base member 12. The base portion 18 is in contact with the base member 12 in a rest state where the operating member 16 is at the first rest position P11. For example, the first biasing member 28 includes a torsion spring. In this specification, the first biasing member 28 can be simply referred to as a biasing member 28. That is, the bicycle operating device 10 comprises the biasing member 28. The biasing member 28 is configured to bias the operating member 16 toward the first rest position P11.

The biasing member 28 is mounted on the pivot pin 22. Specifically, as seen in FIGS. 4 and 5, the biasing member 28 is wound about the pivot pin 22. As seen FIGS. 4 and 6, the biasing member 28 has a first biasing member end 28A hooked on a support shaft 80. As seen in FIGS. 4 and 5, the biasing member 28 has a second biasing member end 28B opposite to the first biasing member end 28A. The second biasing member end 28B is positioned opposite to the operating member 16 relative to the pivot pin 22. The second biasing member end 28B is hooked on a guide pin 46 connected to a piston 38. That is, the second biasing member end 28B is hooked on the piston 38. The support shaft 80, the guide pin 46, and the piston 38 are described later in detail.

As seen in FIG. 4, the bicycle operating device 10 comprises a second biasing member 30 to bias the operating member 16 toward the second rest position P21 (FIG. 3) relative to the base member 12. In this embodiment, the second biasing member 30 biases the operating portion 20 toward the second rest position P21 (FIG. 3) relative to the base portion 18. The second biasing member 30 is mounted on the additional pivot pin 24. The operating portion 20 is in contact with the base portion 18 in a state where the operating portion 20 is at the second rest position. For example, the second biasing member 30 includes a torsion spring.

The bicycle operating device 10 comprises a third biasing member 32 to bias the additional operating member 26 toward the third rest position P31 (FIG. 7) relative to the base member 12. In this embodiment, the third biasing member 32 biases the additional operating member 26 toward the third rest position P31 (FIG. 7) relative to the operating member 16 (the base portion 18). The third biasing member 32 is mounted on the additional pivot pin 24. As seen in FIG. 5, the additional operating member 26 is in contact with the operating member 16 (the operating portion 20) in a state where the operating member 16 and the additional operating member 26 are at the second rest position P21 and the third rest position P31. For example, the third biasing member 32 includes a torsion spring.

As seen in FIG. 4, the bicycle operating device 10 comprises a hydraulic unit 34. The hydraulic unit 34 is provided on the base member 12. The hydraulic unit 34 comprises a cylinder 36 and the piston 38. The cylinder 36 is provided on the base member 12 and includes a cylinder bore 40. The piston 38 is provided in the cylinder bore 40. That is, the piston 38 is disposed in the cylinder 36. The piston 38 is movable in the cylinder bore 40 in a movement direction D4. The cylinder bore 40 has a cylinder center axis 40A extending in the movement direction D4. The cylinder bore 40 and the piston 38 define a hydraulic chamber 42. In this embodiment, the hydraulic unit 34 includes a closing member 43 attached to the cylinder 36 to close an end of the cylinder bore 40. The cylinder bore 40, the piston 38, and the closing member 43 define the hydraulic chamber 42.

The piston 38 is movable relative to the cylinder 36 in the movement direction D4, in response to the movement of the operating member 16 in the first operating direction D1. Specifically, the piston 38 is movable relative to the cylinder 36 between an initial position P41 and an actuated position P42. The piston 38 is at the initial position P41 in the rest state where the operating member 16 is at the first rest position P11 (FIG. 1). The piston 38 is at the actuated position P42 in an operated state where the operating member 16 is at the first operated position P12 (FIG. 1). The piston 38 is configured to be pushed from the initial position P41 to the actuated position P42 in response to the movement of the operating member 16 from the first rest position P11 toward the first operated position P12 to supply a hydraulic pressure toward at least one bicycle component BC1.

As seen in FIG. 4, the piston 38 is movable relative to the cylinder 36 by a stroke ST defined from the initial position P41 to the actuated position P42. The stroke ST of the piston 38 is defined in the movement direction D4. The hydraulic chamber 42 has a variable internal volume which is variable in response to the movement of the piston 38. In this embodiment, the stroke ST of the piston 38 is adjustable between a maximum stroke and a minimum stroke as described later. In such embodiment, the stroke ST of the piston 38 can be defined as the minimum stroke.

Figure 8:
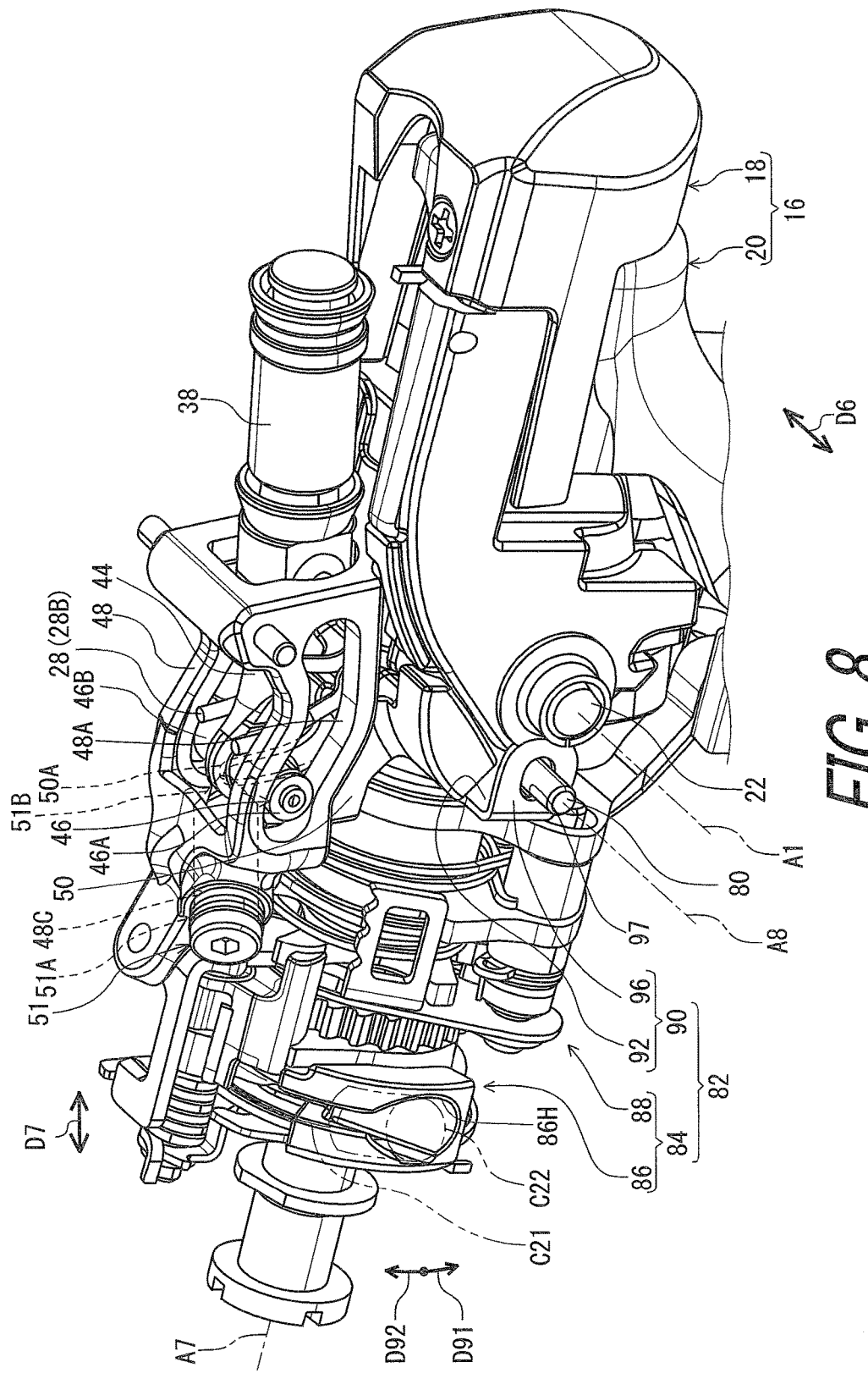
FIG. 8 is a perspective view of an internal structure of the bicycle operating device illustrated in FIG. 1.
Figure 9:
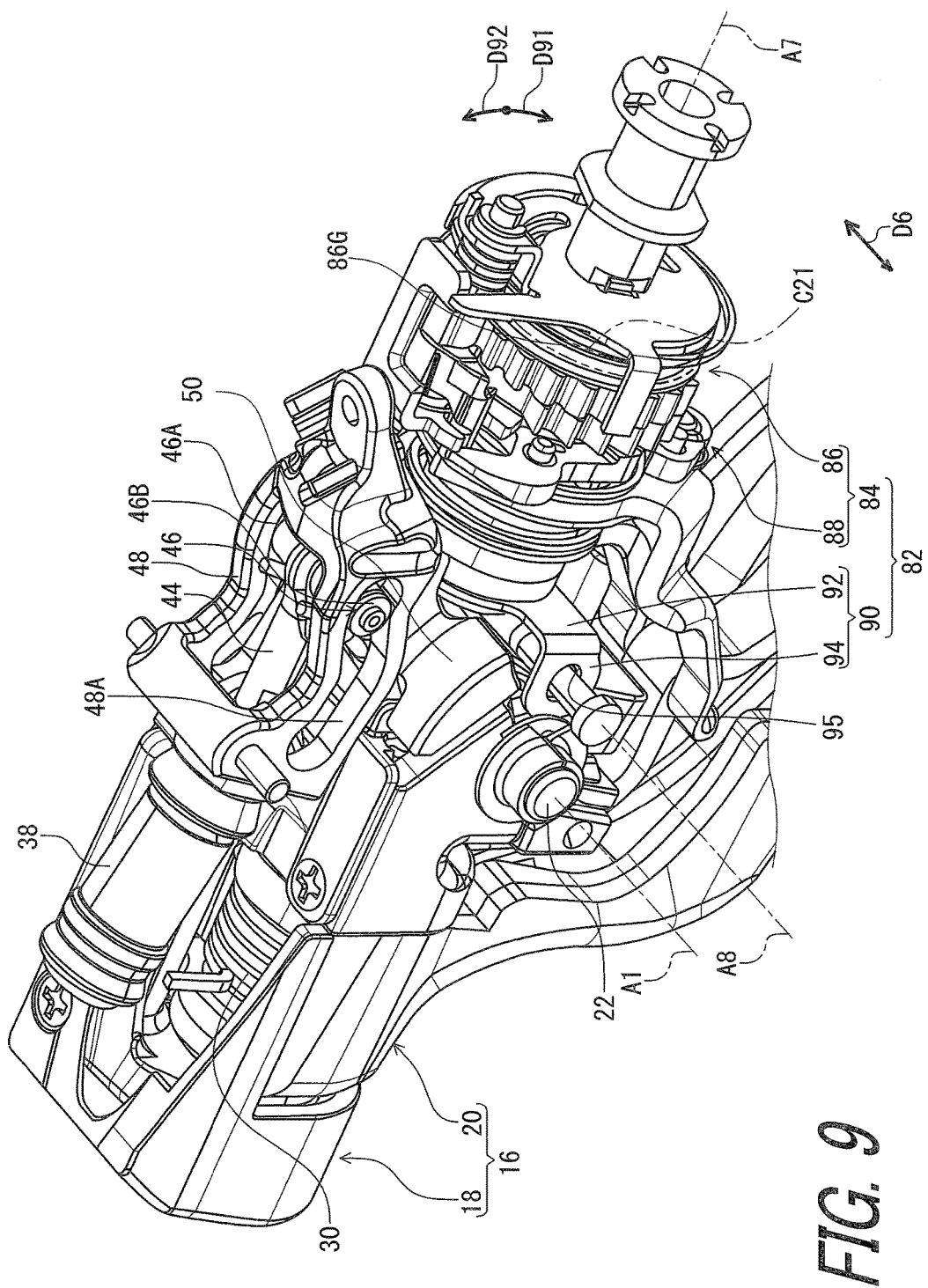
FIG. 9 is another perspective view of the internal structure of the bicycle operating device illustrated in FIG. 1.

As seen in FIGS. 4, 8, and 9, the bicycle operating device 10 comprises a piston rod 44, the guide pin 46, a guide member 48, and a transmitting member 50. The piston rod 44 is operatively coupled to the piston 38. The guide pin 46 is attached to the piston rod 44. The guide member 48 is made of a metal material such as a titanium alloy, a stainless steel and an aluminum alloy. The guide member 48 is detachably attached to the base member 12. The guide member 48 includes a pair of first guide grooves 48A and 48B. Both ends 46A and 46B of the guide pin 46 are movably provided in the first guide grooves 48A and 48B. The first biasing member 28 (the biasing member 28) biases the guide pin 46. The piston 38, the piston rod 44, the guide pin 46 and the guide member 48 is detachable as a unit from the base member 12. The transmitting member 50 is coupled to the operating member 16. That is, the piston 38 is coupled to the operating member 16. The transmitting member 50 is pivotable relative to the base member 12 about the pivot axis A1 to transmit the movement of the operating member 16 to the guide pin 46. Accordingly, the hydraulic unit 34 is configured to generate a hydraulic pressure in response to a movement of the operating member 16.

As seen in FIG. 4, the transmitting member 50 includes a first transmitting end 50A and a second transmitting end 50B. The first transmitting end 50A is in contact with the guide pin 46. The second transmitting end 50B is disposed opposite the first transmitting end 50A relative to the pivot axis A1.

As seen in FIG. 8, the bicycle operating device 10 comprises an adjustment member 51. The adjustment member 51 is movably attached to the guide member 48. Specifically, the adjustment member 51 includes an externally threaded portion 51A. The guide member 48 includes an additional adjustment threaded hole 48C. The externally threaded portion 51A is threadedly engaged with the additional adjustment threaded hole 48C. The adjustment member 51 includes an adjustment end 51B. As seen in FIGS. 4 and 8, the adjustment end 51B is in contact with the first transmitting end 50A of the transmitting member 50. For example, the adjustment end 51B of the adjustment member 51 has a tapered shape. As seen in FIG. 4, The first biasing member 28 biases the guide pin 46 and the first transmitting end 50A toward the adjustment end 51B of the adjustment member 51. The guide pin 46 and the first transmitting end 50A are held between the first biasing member 28 and the adjustment end 51B of the adjustment member 51. This positions the piston 38 at the initial position P41. Furthermore, the transmitting member 50 is positioned at a pivotal position corresponding to the initial position P41 relative to the guide member 48 and the base member 12.

As seen in FIG. 8, rotation of the adjustment member 51 relative to the guide member 48 changes a position of the adjustment member 51 relative to the guide member 48 in an adjustment direction D7 which is non-parallel to a cylinder center axis 40A of the cylinder bore 40. Thus, the rotation of the adjustment member 51 changes the initial position P41 (FIG. 4) of the piston 38 relative to the base member 12. Furthermore, the rotation of the adjustment member 51 changes the pivotal position of the transmitting member 50 relative to the base member 12.

As seen in FIG. 4, the bicycle operating device 10 comprises an additional adjustment member 52. The additional adjustment member 52 is rotatably attached to the second transmitting end 50B. The additional adjustment member 52 includes an adjustment screw 54 and an adjustment contact part 56. The transmitting member 50 includes a threaded hole 50C disposed at the second transmitting end 50B. The adjustment screw 54 is threadedly engaged with the threaded hole 50C. The adjustment contact part 56 is rotatably coupled to an end of the adjustment screw 54. The adjustment contact part 56 is coupled to the base portion 18 to be restricted from rotating relative to the base portion 18.

As seen in FIG. 4, the bicycle operating device 10 comprises an adjustment biasing element 57 provided between the transmitting member 50 and the base portion 18 to apply a biasing force to the transmitting member 50 and the base portion 18. The adjustment biasing element 57 biases the transmitting member 50 and the base portion 18 to push the base portion 18 against the adjustment contact part 56.

As seen in FIG. 8, the rotation of the adjustment member 51 changes the pivotal position of the transmitting member 50 relative to the base member 12. Thus, the rotation of the adjustment member 51 changes the first rest position P11 of the operating member 16 relative to the base member 12. Furthermore, as seen in FIG. 4, rotation of the adjustment screw 54 relative to the transmitting member 50 changes a distance between the second transmitting end 50B and the base portion 18, changing the first rest position P11 of the operating member 16 relative to the base member 12. At this time, the initial position P41 of the piston 38 is not changed since the first transmitting end 50A of the transmitting member 50 is held between the guide pin 46 and the adjustment member 51.

Figure 10:
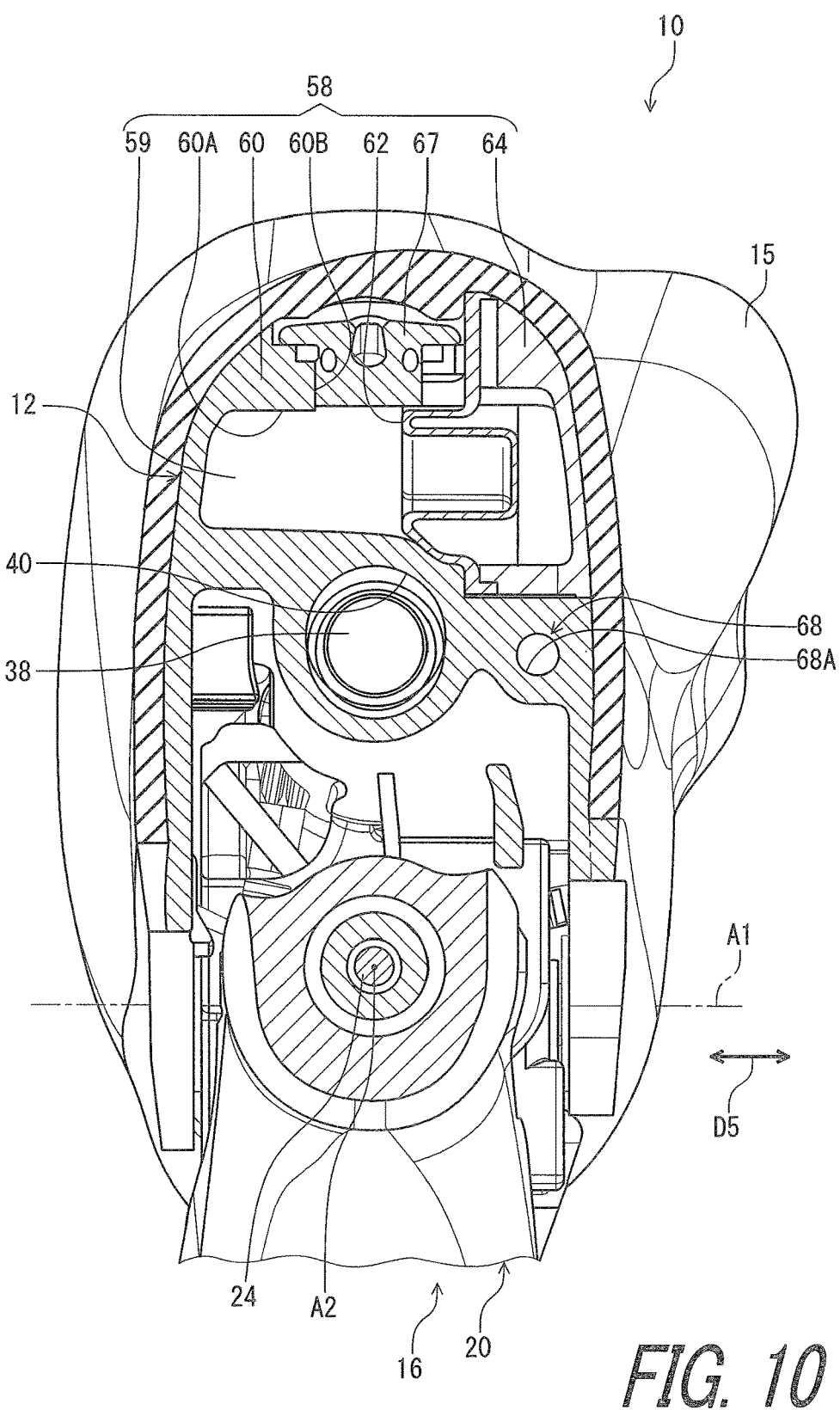
FIG. 10 is a cross-sectional view of the bicycle operating device taken along line X-X of FIG. 4.
Figure 11:
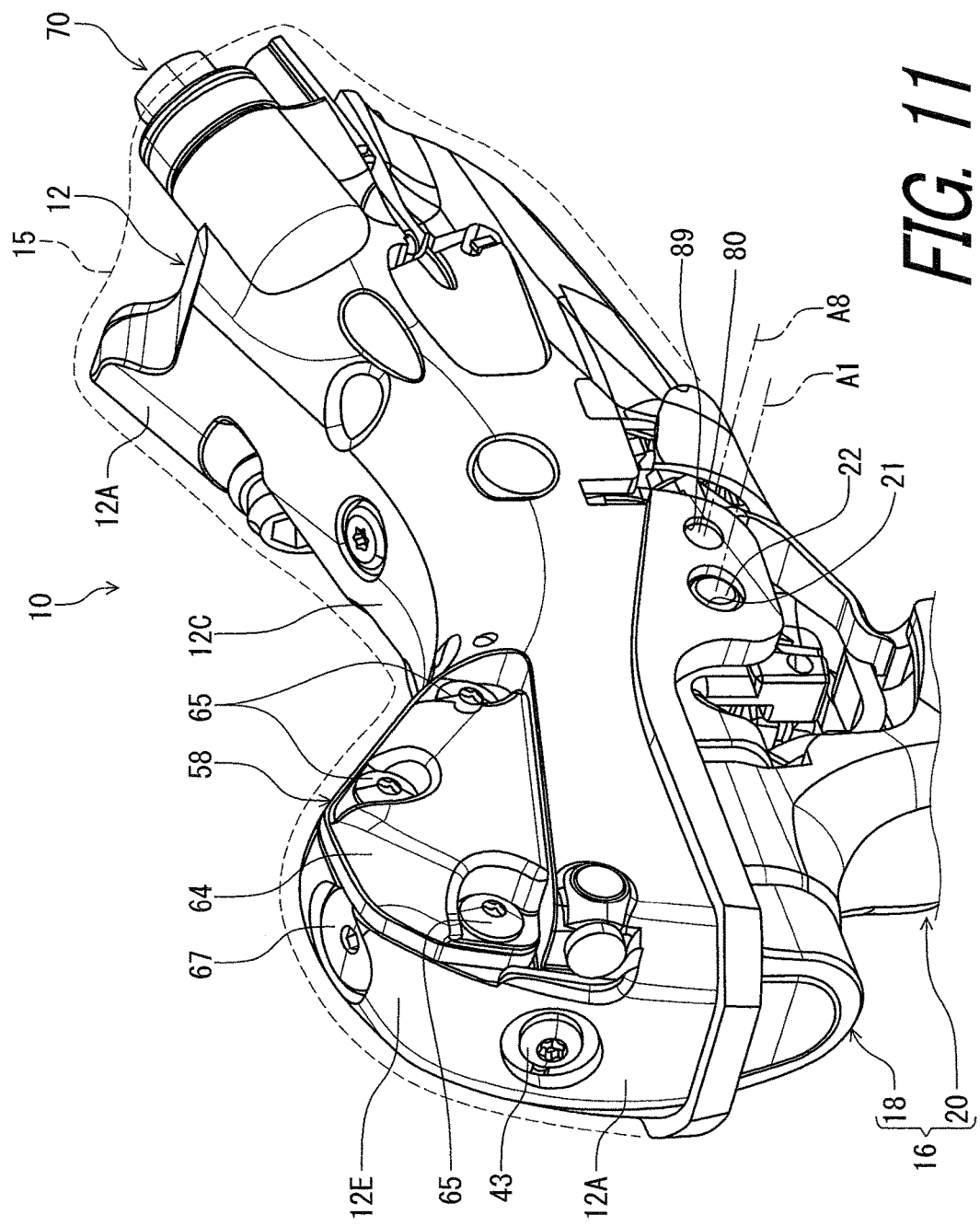
FIG. 11 is a perspective view of the bicycle operating device illustrated in FIG. 1 with a cover member omitted.

As seen in FIG. 10, the hydraulic unit 34 comprises a hydraulic reservoir 58. The hydraulic reservoir 58 includes a reservoir chamber 59 connected to the hydraulic chamber 42. As seen in FIG. 4, the hydraulic reservoir 58 is provided at the second end portion 12B. In this embodiment, as seen in FIGS. 10 and 11, the hydraulic reservoir 58 is provided at the pommel portion 12E.

As seen in FIG. 10, the hydraulic reservoir 58 includes a reservoir tank 60, a diaphragm 62, and a lid 64. The reservoir tank 60 includes a recess 60A. In this embodiment, the reservoir tank 60 is integrally provided with the cylinder 36 as a one-piece unitary member. However, the reservoir tank 60 can be a separate member from the cylinder 36. The diaphragm 62 is at least partly disposed in the recess 60A. The reservoir tank 60 and the diaphragm 62 define the reservoir chamber 59 in the recess 60A. In this embodiment, the hydraulic reservoir 58 includes a bleed member 67. The bleed member 67 is detachably attached to the reservoir tank 60 to close a hole 60B of the reservoir tank 60. The reservoir tank 60, the diaphragm 62, and the bleed member 67 define the reservoir chamber 59 in the recess 60A. The reservoir chamber 59 is connected to the hydraulic chamber 42 via at least one connection holes (not shown). As seen in FIGS. 10 and 11, the lid 64 is detachably attached to the base member 12 with fasteners 65 to cover the recess 60A. The hydraulic reservoir 58 can be omitted from the bicycle operating device 10.

As seen in FIGS. 4 and 10, the cylinder bore 40 is at least partly provided above the pivot axis A1 in the mounting state where the bicycle operating device 10 is mounted to the handlebar H (FIG. 1). The reservoir chamber 59 is provided above the cylinder bore 40 without overlapping with the cylinder bore 40 in a transverse direction D5 parallel to the pivot axis A1 in the mounting state.

Figure 12:
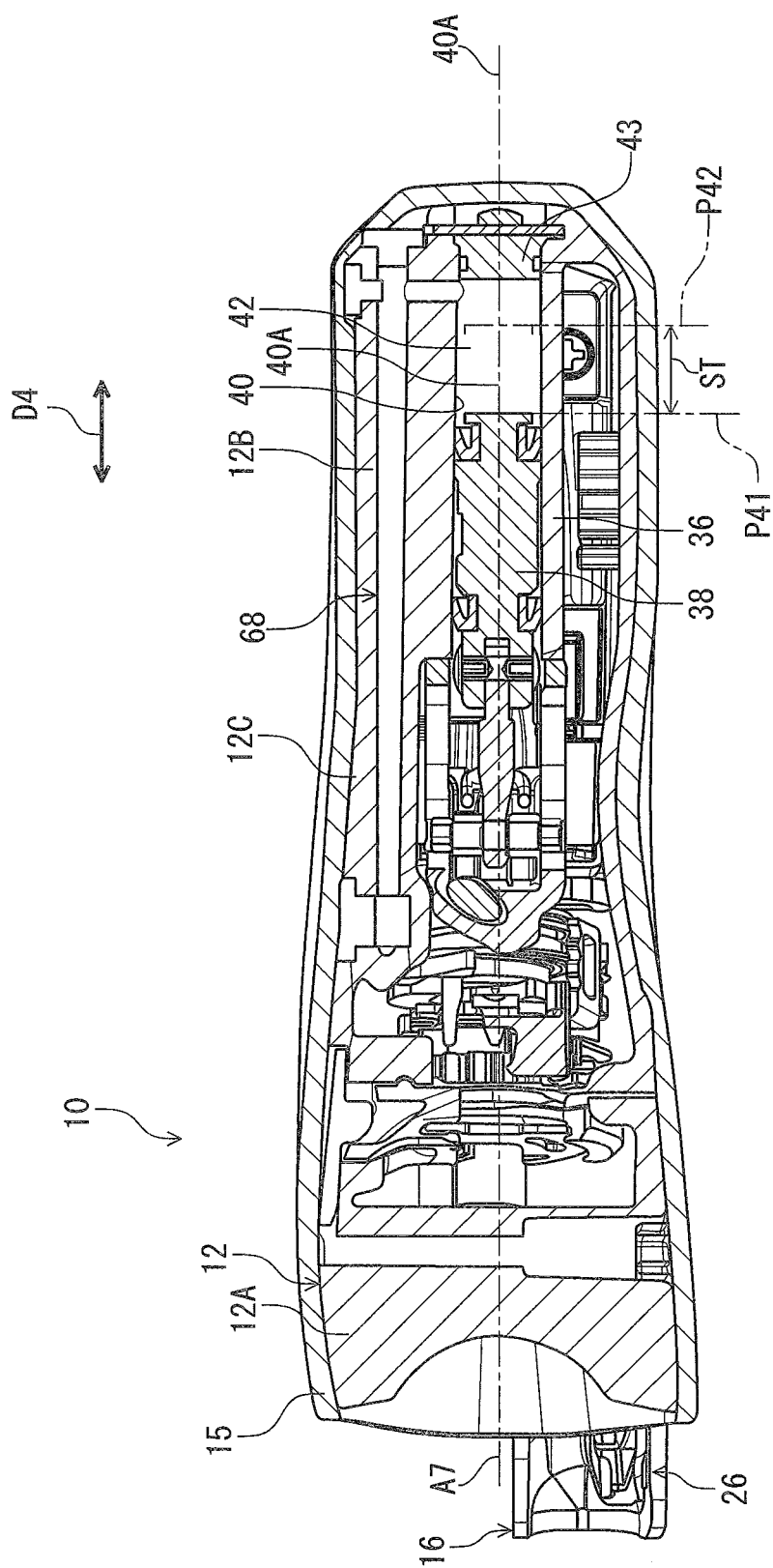
FIG. 12 is a cross-sectional view of the bicycle operating device taken along line XII-XII of FIG. 4.
Figure 13:
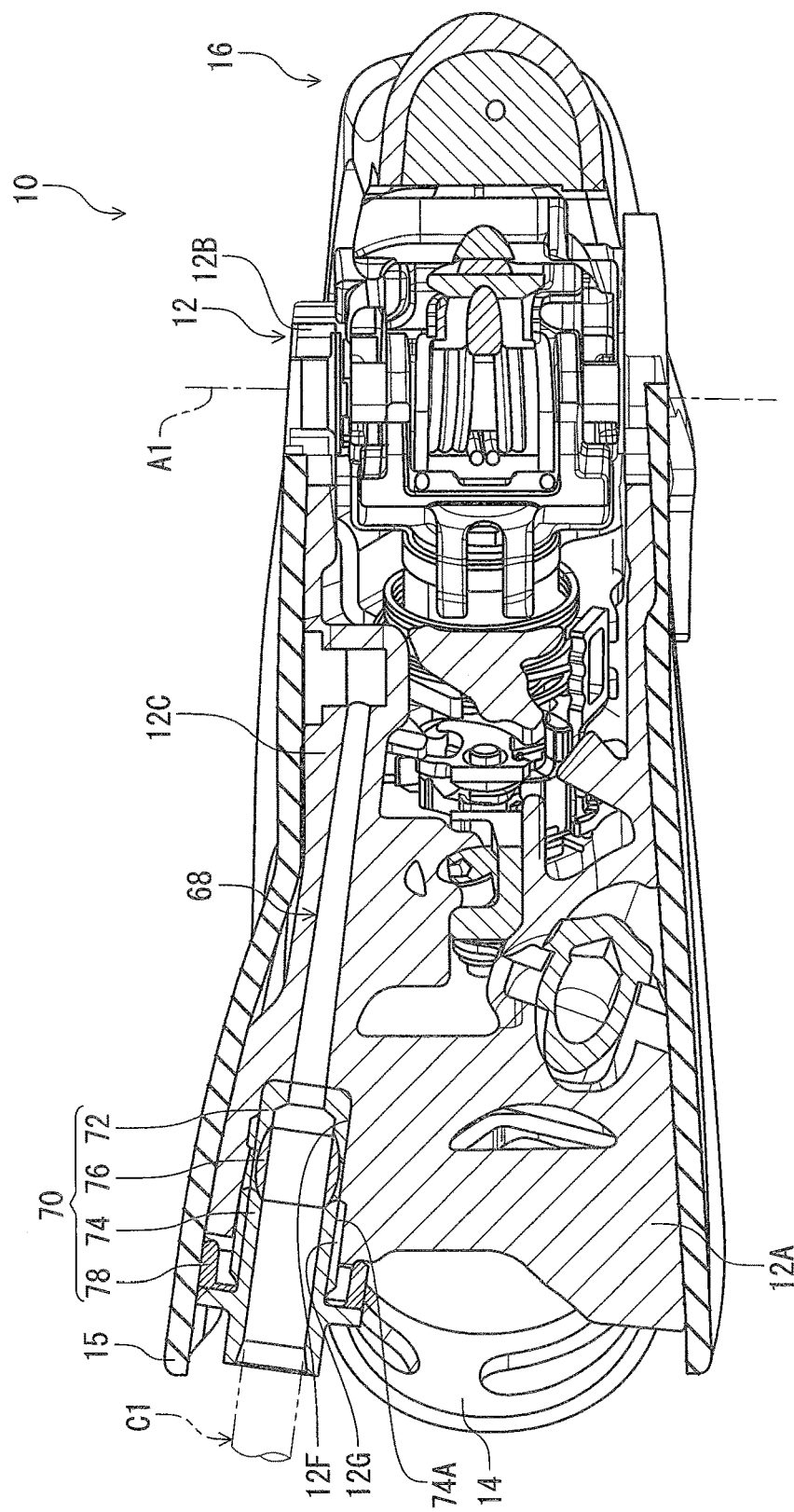
FIG. 13 is a cross-sectional view of the bicycle operating device taken along line XIII-XIII of FIG. 4.

As seen in FIG. 12, the base member 12 includes a fluid passageway 68. The fluid passageway 68 is connected to the hydraulic chamber 42. The fluid passageway 68 is provided inside the base member 12. As seen in FIG. 13, the base member 12 includes an outlet port 70. The outlet port 70 is connected to the fluid passageway 68 and is provided at the first end portion 12A. The fluid passageway 68 is defined from the hydraulic chamber 42 to the outlet port 70. The hydraulic hose C1 is connected to the hydraulic chamber 42 via the outlet port 70. An end of the hydraulic hose C1 is connected to the outlet port 70. As seen in FIG. 10, the base member 12 includes an inner peripheral surface 68A provided in the base member 12 and defining the fluid passageway 68.

As seen in FIG. 13, the outlet port 70 includes a receiving member 72, a connecting member 74, a first seal member 76, and a second seal member 78. The receiving member 72 and the first seal member 76 are provided in a first attachment hole 12F of the base member 12. The first seal member 76 is disposed between the receiving member 72 and the connecting member 74. The second seal member 78 is disposed between the cover member 15 and the connecting member 74. The connecting member 74 includes a first external threaded part 74A. The first attachment hole 12F includes a first internal threaded part 12G threadedly engaged with the first external threaded part 74A. The first and second seal members 76 and 78 are made of an elastic material such as rubber. The first seal member 76 comes into contact with an outer peripheral surface of the hydraulic hose C1 when the connecting member 74 is tightened.

As seen in FIGS. 4, 8, and 9, the bicycle operating device 10 comprises an operating unit 82. The operating unit 82 includes a rotatable member 84 rotatable relative to the base member 12 about a first rotational axis A7 to control the bicycle component BC2. In this embodiment, the operating unit 82 is a shift operating unit to operate the shift device BC2 to perform gear shift of a bicycle. The bicycle operating device 10 further comprises an additional support shaft 81. The additional support shaft 81 defines the first rotational axis A7. As seen in FIGS. 2, 4, and 7, the additional support shaft 81 is coupled to the base member 12 via an operating unit fastening bolt 79. The operating unit fastening bolt 79 includes a second external threaded part 79A. The additional support shaft 81 has a second attachment hole 81A. The second attachment hole 81A includes a second internal threaded part 81B threadedly engaged with the second external threaded part 79A. The additional support shaft 81 supports the operating unit 82. The operating unit 82 has a first operating unit end 82A and a second operating unit end 82B opposite to the first operating unit end 82A along the first rotational axis A7. The first operating unit end 82A is supported by the base member 12 via the additional support shaft 81.

As seen in FIGS. 4, 8, and 9, the bicycle operating device 10 comprises the support shaft 80. The support shaft 80 couples the second operating unit end 82B to the base member 12. The support shaft 80 has a center axis A8. The pivot pin 22 and the support shaft 80 are substantially parallel to each other. The support shaft 80 extends in the direction D6 substantially parallel to the center axis A8. As seen in FIGS. 1 and 4, the support shaft 80 is provided between the first end portion 12A and the second end portion 12B. Specifically, as seen in FIGS. 4, 8, and 9, the support shaft 80 is disposed between the pivot pin 22 and operating unit 82 viewed in the direction D6 parallel to the pivot pin 22. The support shaft 80 extends in the direction D6 non-parallel to the first rotational axis A7. Specifically, the support shaft 80 extends in the direction D6 substantially perpendicular to the first rotational axis A7.

The operating unit 82 further includes a shaft attachment member 90 at the second operating unit end 82B. As seen in FIG. 4, the shaft attachment member 90 rotatably supports the rotatable member 84 rotatable relative to the base member 12 about a first rotational axis A7. As seen in FIGS. 8, and 9, the shaft attachment member 90 is U shaped. Specifically, the shaft attachment member 90 includes a base portion 92, a first extension portion 94, and a second extension portion 96. The base portion 92 is connected to the rotatable member 84 such that the rotatable member 84 is rotatable relative to the base portion 92. The base portion 92 extends in the direction D6. One end of the base portion 92 in the direction D6 is referred to as a first end. The other end of the base portion 92 opposite to the first end in the direction D6 is referred to as a second end. The first extension portion 94 extends from the first end of the base portion 92 towards the pivot pin 22. The second extension portion 96 extends from the second end of the base portion 92 towards the pivot pin 22. The first extension portion 94 has a third through hole 95. The second extension portion 96 has a fourth through hole 97.

Figure 6:
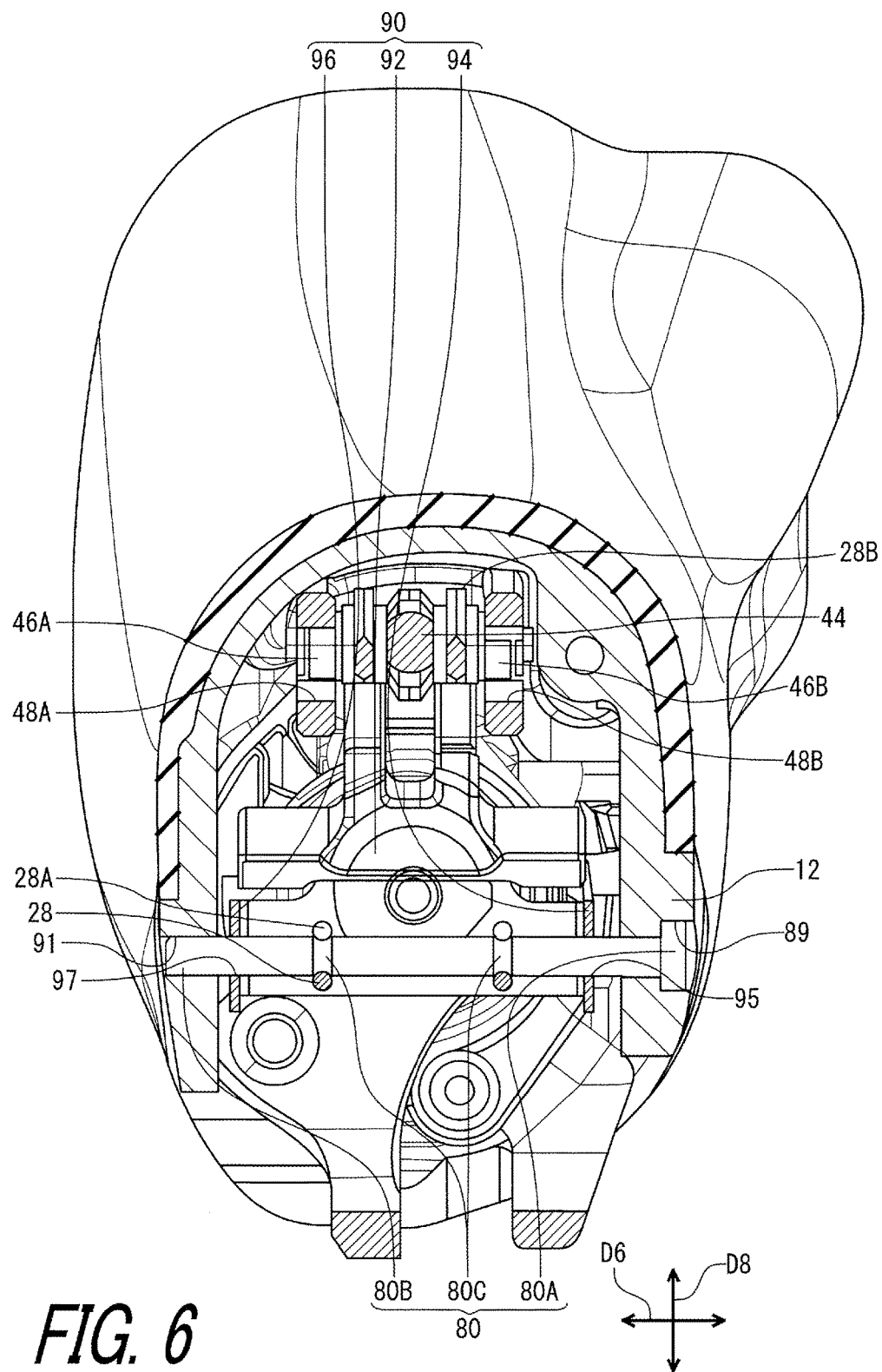
FIG. 6 is a partial cross-sectional view of the bicycle operating device taken along line VI-VI of FIG. 1.

As seen in FIG. 6, the support shaft 80 extends through the third through hole 95 and the fourth through hole 97. The support shaft 80 has a first end 80A and a second end 80B opposite to the first end 80A. The first end 80A is close to the third through hole 95. The third through hole 95 is closer to the first end 80A than the fourth through hole 97. The second end 80B is close to the fourth through hole 97. The fourth through hole 97 is closer to the second end 80B than the third through hole 95. The support shaft 80 has a groove 80C. The groove 80C is provided between the first end 80A and the second end 80B in the direction D6. In this embodiment, the support shaft 80 has two grooves 80C. However, the number of the grooves can be one or more than two. The biasing member 28 is hooked on the groove 80C.

The first end 80A and the second end 80B are supported by the base member 12. Specifically, the base member 12 has a fifth through hole 89 and a sixth through hole 91. The sixth through hole 91 is opposite to the fifth through hole 89 in the direction D6. The first end 80A of the support shaft 80 is received in the fifth through hole 89. The second end 80B of the support shaft 80 is received in the sixth through hole 91. A diameter of the first end 80A is larger than a diameter of the second end 80B. Accordingly, a diameter of the fifth through hole 89 is larger than the sixth through hole 91. The diameters of the first end 80A, the second end 80B, the fifth through hole 89, and the sixth through hole 91 are defined by a radial direction D8 perpendicular to the direction D6. Therefore, the fifth through hole 89 can position the support shaft 80 in an axial direction D6 of the support shaft 80. In addition, the first end 80A may fit into the fifth through hole 89 such that the fifth through hole 89 positions the support shaft 80 in the radial direction D8.

The rotatable member 84 includes a cable holding section 86 configured to engage with a cable. As seen in FIG. 8, the cable is an inner wire C21 of the mechanical control cable C2. The mechanical control cable C2 includes a hook C22 at one end of the inner wire C21. The cable holding section 86 has a hook hole 86H in which the hook C22 is secured in the mounting state of the bicycle operating device 10. The cable holding section 86 has a second guide groove 86G to guide the inner wire C21. The cable holding section 86 pivots relative to the base member 12 about the first rotational axis A7 in response to the movement of the operating member 16 and the additional operating member 26.

The rotatable member 84 includes a cable operating structure 88 operatively coupling the operating member 16 and the additional operating member 26 to the cable holding section 86. Specifically, as seen in FIGS. 8 and 9, the cable operating structure 88 pivots the cable holding section 86 relative to the base member 12 in one of a pulling direction D91 and a releasing direction D92 in response to the movement of the operating member 16 (FIG. 3). Furthermore, the cable operating structure 88 pivots the cable holding section 86 relative to the base member 12 in the other of the pulling direction D91 and the releasing direction D92 in response to the movement of the additional operating member 26 (FIG. 7). In this embodiment, the cable operating structure 88 pivots the cable holding section 86 relative to the base member 12 in the releasing direction D92 in response to the movement of the operating member 16 (FIG. 3). Furthermore, the cable operating structure 88 pivots the cable holding section 86 relative to the base member 12 in the pulling direction D91 in response to the movement of the additional operating member 26 (FIG. 7). Structures of the operating unit 82 have been known in the bicycle field, so they will not be described in detail here for the sake of brevity.

Second Embodiment

A bicycle operating device 210 in accordance with a second embodiment will be described below referring to FIG. 14. The bicycle operating device 210 has the same structure and/or configuration as those of the bicycle operating device 10 except for the base member 12 and the support shaft 80. Thus, elements having substantially the same function as those in the first embodiment will be numbered the same here, and will not be described and/or illustrated again in detail here for the sake of brevity.

Figure 14:
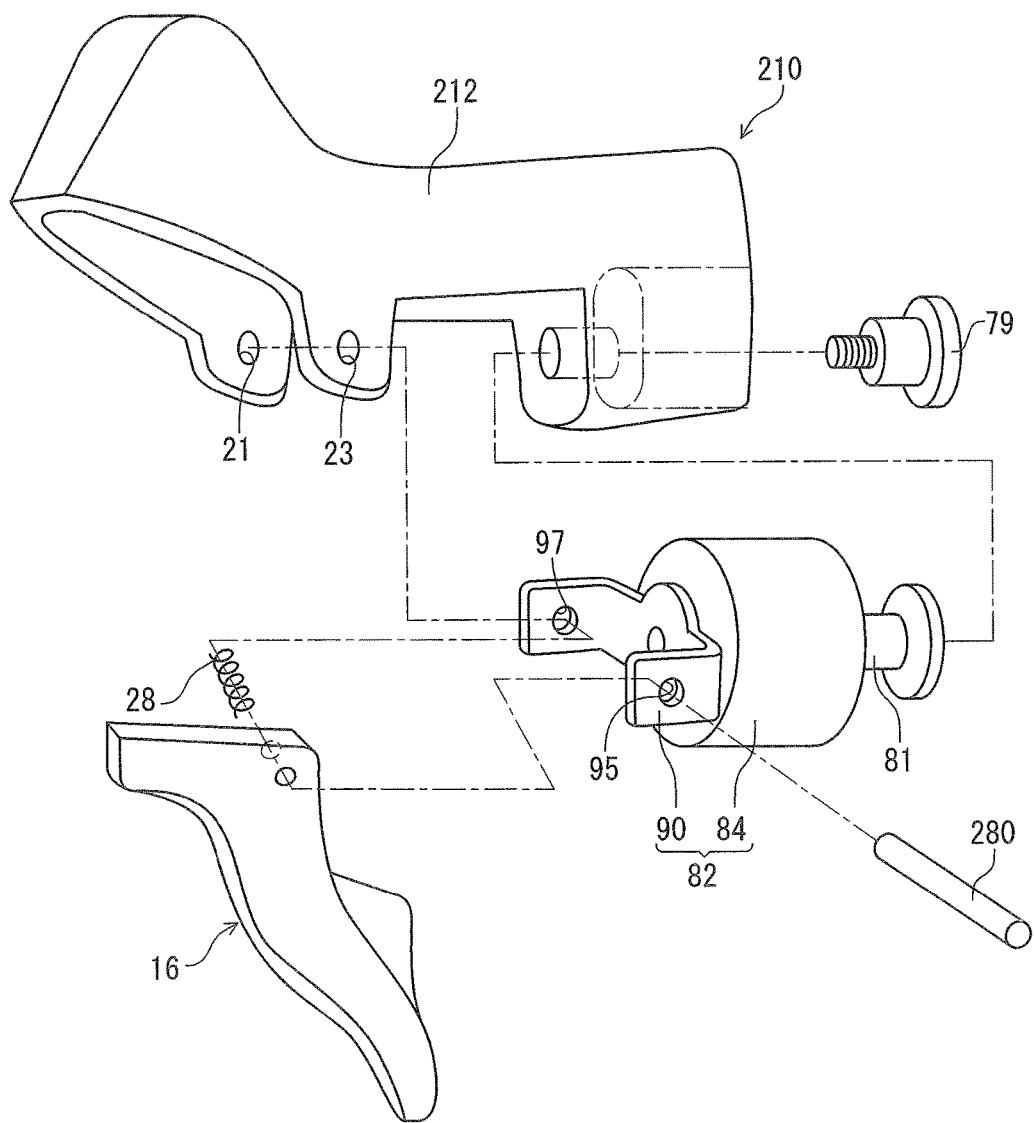
FIG. 14 is an exploded schematic view of a bicycle operating device in accordance with a second embodiment.

As seen in FIG. 14, the bicycle operating device 210 comprises a base member 212 and a support shaft 280. The base member 212 has substantially the same structure as that of the base member 12 of the first embodiment. Unlike the base member 12 of the first embodiment, the base member 212 does not include the fifth through hole 89 and the sixth through hole 91. The support shaft 280 has substantially the same structure as that of the pivot pin 22 of the first embodiment. In this embodiment, the support shaft 280 extends through the third through hole 95 and the fourth through hole 97 of the shaft attachment member 90. The support shaft 280 supports both the operating unit 82 and the operating member 16. In other words, the bicycle operating device 210 further comprises the operating member 16 rotatably coupled to the base member 212 via the support shaft 280. In this embodiment, the first biasing member end 28A of the biasing member 28 may not be hooked on the support shaft 280. The first biasing member end 28A of the biasing member 28 may be hooked on a part of the base member 212.

It will be apparent to those skilled in the bicycle field from the present disclosure that the above embodiments can be at least partly combined with each other.

The hydraulic bicycle component BC1 may be a mechanical driven bicycle component. In this case, the hydraulic unit 34 may be replaced with a cable operating unit to operate a cable connected to the bicycle component BC1.

In the shaft attachment member 90, one of the first extension portion 94 and the second extension portion 96 may be omitted. In a case where the second extension portion 96 is omitted, the first extension portion 94 may extend from a part of the base portion 92 that is different from the first end of the base portion 92. For example, the first extension portion 94 may extend from a center of the base portion 92.

The term "configured" as used herein to describe a component, section or part of a device includes hardware and/or software that is constructed and/or programmed to carry out the desired function. The desired function can be carried out by hardware, software, or a combination of hardware and software.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
   a base member;
   an operating unit including a rotatable member rotatable relative to the base member about a first rotational axis to control a bicycle component, the operating unit having a first operating unit end supported by the base member and a second operating unit end opposite to the first operating unit end along the first rotational axis; and
   a support shaft extending in a direction non-parallel to the first rotational axis and coupling the second operating unit end to the base member, the support shaft having a first end and a second end opposite to the first end, the first end and the second end being supported by the base member.

2. The bicycle operating device according to claim 1, further comprising:
   a pivot pin coupled to the base member;
   an operating member rotatably coupled to the base member via the pivot pin; and
   a biasing member wound about the pivot pin, the biasing member having a first biasing member end hooked on the support shaft.

3. The bicycle operating device according to claim 2, wherein
   the biasing member is configured to bias the operating member toward a rest position.

4. The bicycle operating device according to claim 2, wherein
   the support shaft has a groove, the biasing member being hooked on the groove.

5. The bicycle operating device according to claim 4, further comprising
   a hydraulic unit configured to generate a hydraulic pressure in response to a movement of the operating member, the hydraulic unit including a cylinder and a piston disposed in the cylinder, the piston being coupled to the operating member,
   wherein
      the biasing member has a second biasing member end opposite to the first biasing member end, and
      the second biasing member end is hooked on the piston.

6. The bicycle operating device according to claim 5, wherein
   the second biasing member end is positioned opposite to the operating member relative to the pivot pin.

7. The bicycle operating device according to claim 2, wherein
   the pivot pin and the support shaft are substantially parallel to each other.

8. The bicycle operating device according to claim 7, wherein the support shaft is disposed between the pivot pin and operating unit viewed in a direction parallel to the pivot pin.

9. The bicycle operating device according to claim 1, further comprising
an additional support shaft coupled to the base member and supporting the operating unit, the additional support shaft defining the first rotational axis.

10. The bicycle operating device according to claim 1, wherein
the rotatable member includes a cable holding section configured to engage with a cable.

11. The bicycle operating device according to claim 1, wherein
the operating unit is a shift operating unit to operate a shift device as the bicycle component to perform a gear shift of a bicycle.

12. The bicycle operating device according to claim 1, wherein
the base member includes
a first end portion configured to be coupled to a bicycle handle in a state where the bicycle operating device is mounted to the bicycle handle, and
a second end portion opposite to the first end portion, and
the support shaft is provided between the first end portion and the second end portion.

13. The bicycle operating device according to claim 12, wherein
the first end portion includes a mounting surface having a curved shape fitted to a drop-down handlebar.

14. The bicycle operating device according to claim 12, wherein
the base member includes a grip portion arranged between the first end portion and the second end portion.

15. The bicycle operating device according to claim 12, wherein
the second end portion includes a pommel portion.

16. The bicycle operating device according to claim 1, wherein
the base member is made of resin.

17. The bicycle operating device according to claim 1, further comprising:
an operating member rotatably coupled to the base member via the support shaft.

18. The bicycle operating device according to claim 1, wherein
the second operating unit end is supported by the base member via the support shaft.

* * * * *